US012393107B2

(12) United States Patent
Kamijo et al.

(10) Patent No.: US 12,393,107 B2
(45) Date of Patent: Aug. 19, 2025

(54) CAMERA MOUNTING STRUCTURE

(71) Applicant: Honda Motor Co., Ltd., Tokyo (JP)

(72) Inventors: Satoru Kamijo, Tokyo (JP); Kyosuke Inada, Tokyo (JP); Ko Hosokawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 114 days.

(21) Appl. No.: 18/277,491

(22) PCT Filed: Mar. 31, 2021

(86) PCT No.: PCT/JP2021/013826
§ 371 (c)(1),
(2) Date: Aug. 16, 2023

(87) PCT Pub. No.: WO2022/208721
PCT Pub. Date: Oct. 6, 2022

(65) Prior Publication Data
US 2024/0126151 A1    Apr. 18, 2024

(51) Int. Cl.
*G03B 17/56* (2021.01)
*B62J 45/41* (2020.01)
(Continued)

(52) U.S. Cl.
CPC ............ *G03B 17/561* (2013.01); *B62J 45/41* (2020.02); *B62J 45/423* (2020.02); *F16M 11/123* (2013.01)

(58) Field of Classification Search
CPC ............................... B60R 11/04; H04N 13/239
See application file for complete search history.

(56) References Cited

U.S. PATENT DOCUMENTS 6,762,790 B1 *  7/2004  Matko ................... F16M 11/10
                                                          396/428
12,035,023 B2 *  7/2024  Kim ...................... F16M 13/02
(Continued)

FOREIGN PATENT DOCUMENTS

JP    2004-175128 A    6/2004
JP    2013-164869 A    8/2013
(Continued)

OTHER PUBLICATIONS

Gil et al, "Motorcycles That See: Multifocal Stereo Vision Sensor for Advanced Safety Systems in Tilting Vehicles." Sensors 18, No. 1 (Jan. 19, 2018): 1-34. https://doi.org/10.3390/s18010295 (Year: 2018).*

(Continued)

*Primary Examiner* — Leon W Rhodes, Jr.
(74) *Attorney, Agent, or Firm* — Birch, Stewart, Kolasch & Birch, LLP

(57) ABSTRACT

To provide a camera mounting structure that can protect a camera attached to the front of the body from bouncing stones or the like. In a camera mounting structure applied to a saddled vehicle with a body having a front to which a camera is attached, the camera is disposed at a position on the saddled vehicle below a headlamp and above a front fender. The camera is attached to a bracket fixed to the body. A yaw rotation shaft that allows a swinging motion in a yaw direction relative to the body is provided to the bracket. A pitch rotation shaft that allows a swinging motion in a pitch direction of the camera is provided to the bracket.

8 Claims, 4 Drawing Sheets

(51) Int. Cl.
*B62J 45/423* (2020.01)
*F16M 11/12* (2006.01)

(56) References Cited

U.S. PATENT DOCUMENTS

| | | | |
|---|---|---|---|
| 2014/0375805 A1* | 12/2014 | Gau | H04N 23/51 |
| | | | 348/148 |
| 2015/0365603 A1 | 12/2015 | Wahl et al. | |
| 2019/0283659 A1 | 9/2019 | Moerbe | |
| 2020/0017164 A1 | 1/2020 | Saeki | |
| 2021/0061389 A1 | 3/2021 | Kawamura et al. | |

FOREIGN PATENT DOCUMENTS

| | | |
|---|---|---|
| JP | 2016-505450 A | 2/2016 |
| JP | 2017-171223 A | 9/2017 |
| JP | 209-39759 A | 3/2019 |
| JP | 2020-6876 A | 1/2020 |
| JP | 2020-500766 A | 1/2020 |
| WO | WO 2019/224957 A1 | 11/2019 |

OTHER PUBLICATIONS

International Search Report (PCT/ISA/210) issued in PCT/JP2021/013826, dated May 25, 2021.
Japanese Office Action for Japanese Application No. 2023-510016, dated Mar. 5, 2024, with an English translation.

* cited by examiner

CAMERA MOUNTING STRUCTURE

FIELD

The present invention relates to a camera mounting structure, and in particular relates to a camera mounting structure for attaching a camera to the front of the body of a saddled vehicle.

BACKGROUND

There is conventionally known configuration in which a camera that captures images of the space in front of the body of a saddled vehicle is attached to the front of the body for auto cruise running, automatic brake control and the like.

Patent Literature 1 discloses configuration of a motorcycle including a front cowl that supports a headlamp and also, as a cover, extends to the sides of a power unit, in which configuration a pair of left and right cameras are embedded at positions which are on the left and right sides of a front fender covering the upper front of the front wheel, and are on the lower side of the front cowl.

CITATION LIST

Patent Literature

Patent Literature 1: JP-2020-6876-A

BRIEF SUMMARY

Technical Problem

However, the cameras in the configuration of Patent Literature 1 are disposed at the positions close to the road surface, and there is a possibility that the cameras are influenced by bouncing stones or the like from the road surface.

An object of the present invention is to solve the problem of the conventional technology described above, and provide a camera mounting structure that can protect a camera attached to the front of the body from bouncing stones or the like.

Solution to Problem

In order to achieve the object, the present invention has a first feature that in a camera mounting structure applied to a saddled vehicle (1) with a body having a front to which a camera (30) is attached, the camera (30) is disposed at a position on the saddled vehicle (1) below a headlamp (7) and above a front fender (11).

In addition, the present invention has a second feature that the camera (30) is attached to a bracket (40) fixed to the body.

In addition, the present invention has a third feature that a yaw rotation shaft (44) that allows a swinging motion in a yaw direction relative to the body is provided to the bracket (40).

In addition, the present invention has a fourth feature that a pitch rotation shaft (41) that allows a swinging motion in a pitch direction of the camera (30) is provided to the bracket (40).

Furthermore, the present invention has a fifth feature that the camera (30) is rubber-mounted on the bracket (40).

Advantageous Effects

According to the first feature, since in the camera mounting structure applied to the saddled vehicle (1) with the body having the front to which the camera (30) is attached, the camera (30) is disposed at a position on the saddled vehicle (1) below the headlamp (7) and above the front fender (11), the camera is disposed at a position apart from the road surface, and the camera can be protected from bouncing stones or the like.

According to the second feature, since the camera (30) is attached to the bracket (40) fixed to the body, attachment/detachment work of the camera becomes easier.

According to the third feature, since the yaw rotation shaft (44) that allows a swinging motion in the yaw direction relative to the body is provided to the bracket (40), it becomes possible to adjust the angle of the camera in the yaw direction.

According to the fourth feature, since the pitch rotation shaft (41) that allows a swinging motion of the camera (30) in the pitch direction is provided to the bracket (40), it becomes possible to adjust the angle of the camera in the pitch direction.

According to the fifth feature, since the camera (30) can be rubber-mounted on the bracket (40), the camera can be protected from vibrations at the time of running.

DETAILED DESCRIPTION

Figure 1:
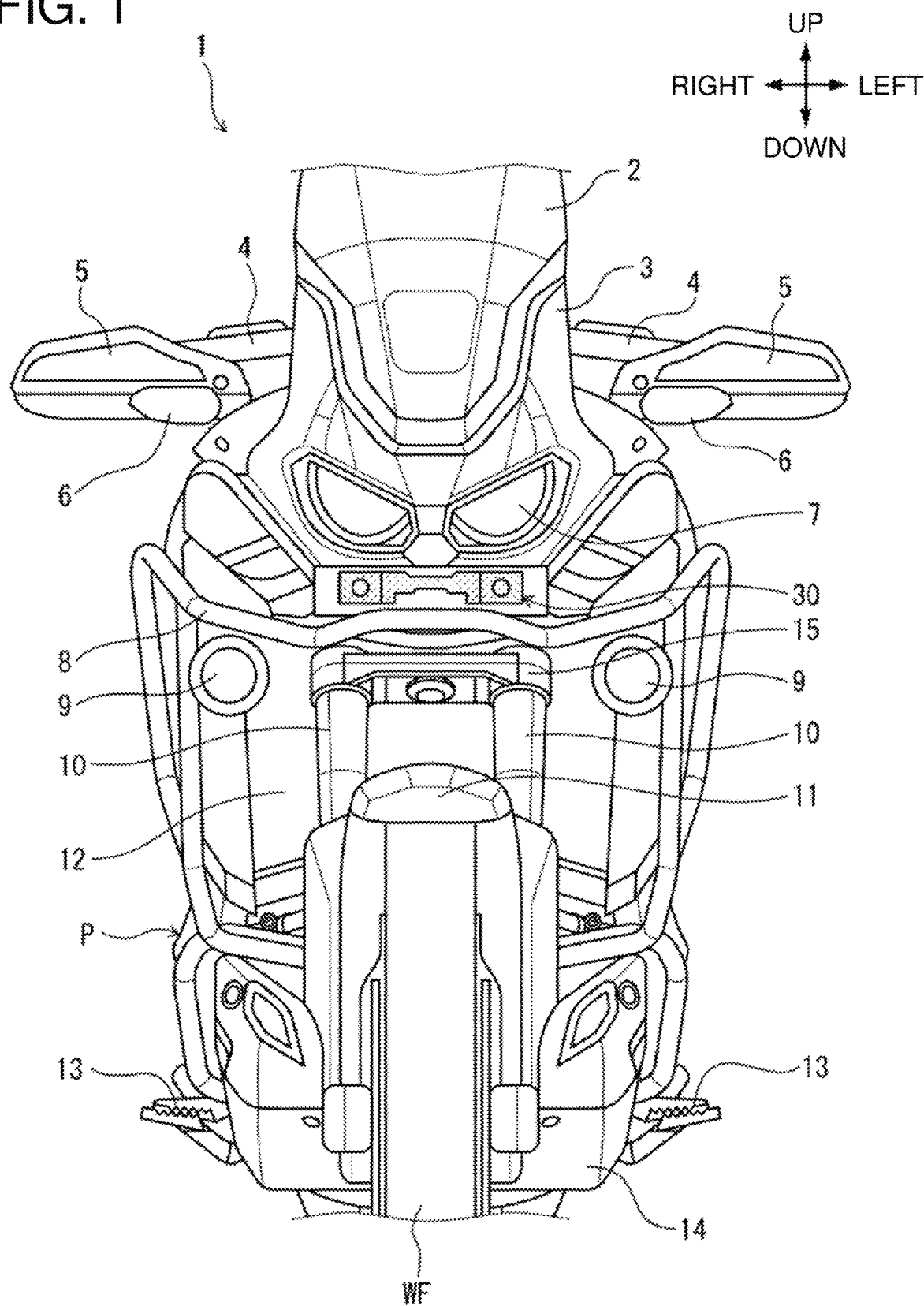
FIG. 1 is a front view of a motorcycle to which a camera mounting structure according to one embodiment according to the present invention is applied.

Hereinbelow, a preferred embodiment of the present invention is explained in detail with reference to the figures. FIG. 1 is a front view of a motorcycle 1 to which a camera mounting structure according to one embodiment according to the present invention is applied. The motorcycle 1 is a saddled vehicle that runs with drive force of a power unit P being transferred to the rear wheel. A bottom bridge 15 that supports a pair of left and right front forks 10 is fixed at the lower end of a steering stem that is swingably journaled to a head pipe provided at the front end of the body frame. A steering handlebar 4 extending in the vehicle width direction is attached to the upper end of the steering stem, and handlebar covers 5 are disposed in front of the steering handlebar 4. A front cowl 3 that supports headlamps 7 and a windshield 2 is disposed in front of the head pipe. A pair of left and right front flasher lamps 6 are attached to the front cowl 3.

A front fender 11 that covers the upper front of a front wheel WF is attached to the front fork 10. A guard pipe 8 that protects the space around the front cowl 3 is disposed below the headlamps 7, and a pair of left and right auxiliary lamps 9 are disposed below the guard pipe 8. A radiator 12 is disposed in front of the power unit P, and a pair of left and right step bars 13 on which a driver places her/his feet are disposed on the sides of the power unit P.

A camera 30 (dot hatching portion) according to the present invention is disposed in an opening provided through the front cowl 3 at a position below the headlamps 7 and above the front fender 11.

Figure 2:
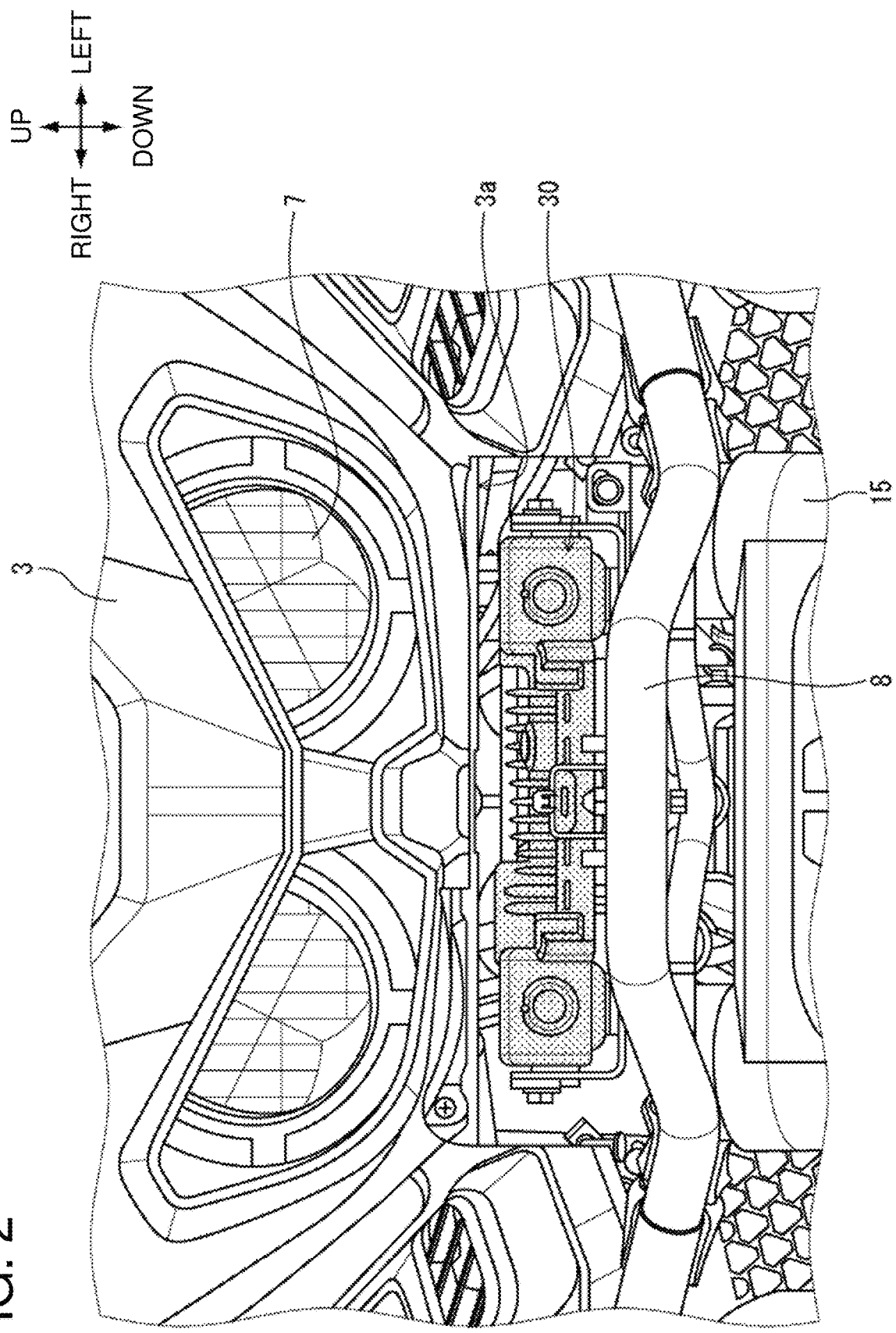
FIG. 2 is a partially enlarged view of FIG. 1.

FIG. 2 is a partially enlarged view of FIG. 1. The camera 30 used for auto cruise running or automatic brake control is housed in an opening 3a of the front cowl 3 provided below the headlamps 7. The opening 3a is provided at a position below the headlamps 7 and above the bottom bridge 15 and the guard pipe 8.

Figure 3:
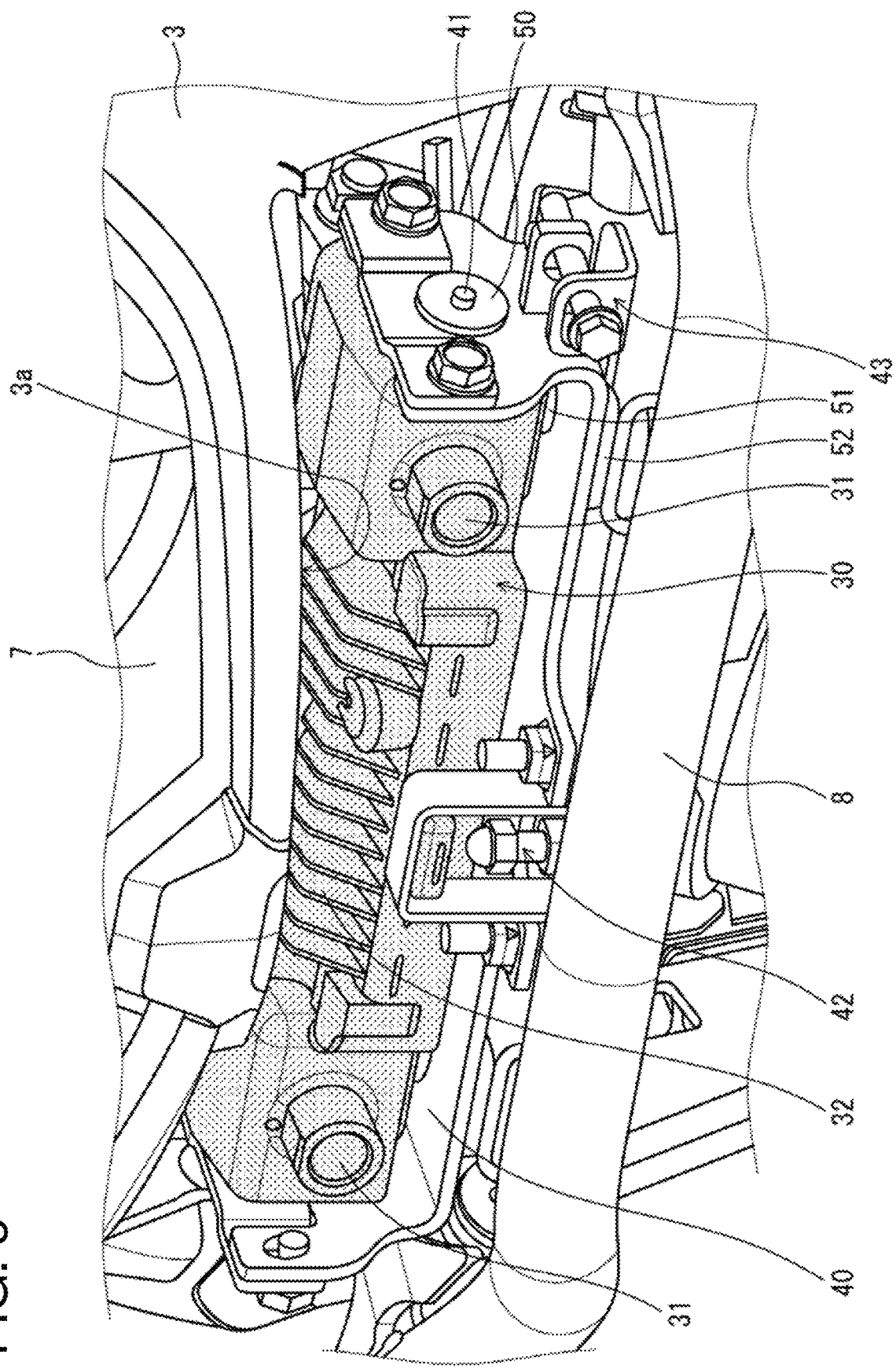
FIG. 3 is a perspective view depicting a state where a camera is mounted on the body.
Figure 4:
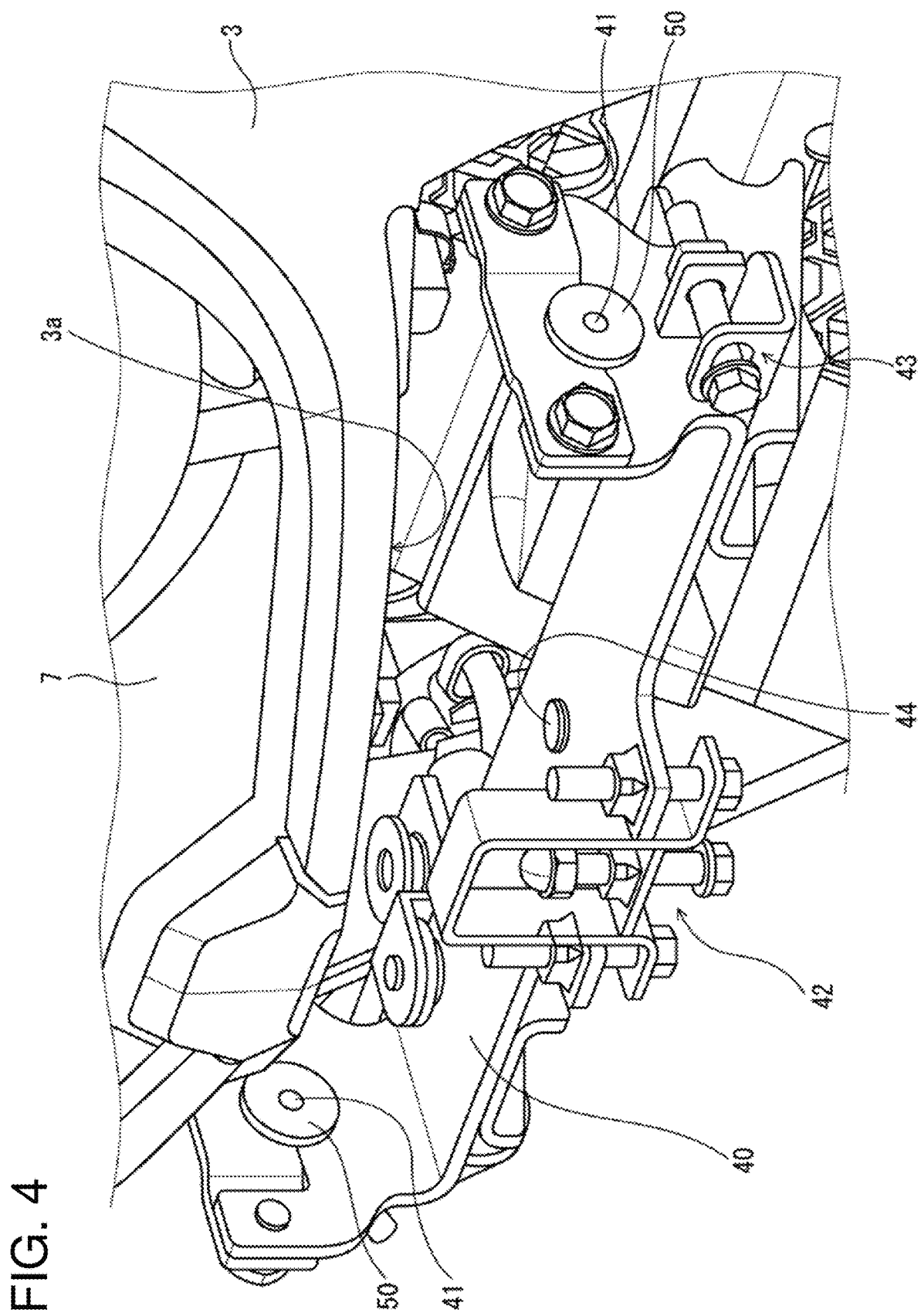
FIG. 4 is a perspective view depicting a state where the camera is removed from a bracket.

FIG. 3 is a perspective view depicting a state where the camera 30 is mounted on the body. In addition, FIG. 4 is a perspective view depicting a state where the camera 30 is removed from a bracket 40. The camera 30 has a horizontally-long shape in which cooling fins 32 are disposed between a pair of left and right lenses 31 that are apart from each other in the vehicle width direction. The camera 30 is attached to the bracket 40 made of a sheet-like metal or the like. The bracket 40 is supported by a yaw rotation shaft 44 that allows a swinging motion in the yaw direction relative to the body, and is configured to allow a yaw adjustment mechanism 43 to adjust the angle in the yaw direction.

In addition, the camera 30 is supported by pitch rotation shafts 41 that allow a swinging motion in the pitch direction relative to the bracket 40, and is configured to allow a pitch adjustment mechanism 42 to adjust the angle in the pitch direction. The pitch rotation shafts 41 are disposed across rubber members 50. In addition, rubber members 51 are interposed between the bracket 40 and the camera 30, and rubber members 52 are interposed between the bracket 40 and the body. Due to these rubber members, the camera 30 can be rubber-mounted on the body, and the camera 30 can be protected from vibrations at the time of running.

As described above, since the camera 30 is disposed at a position on the motorcycle 1 below the headlamps 7 and above the front fender 11 in the camera mounting structure according to the present embodiment, the camera is disposed at a position apart from the road surface, and the camera can be protected from bouncing stones or the like. In addition, since the camera 30 is attached to the bracket 40 fixed to the body, attachment/detachment work of the camera becomes easier. In addition, since the yaw rotation shaft 44 that allows a swinging motion in the yaw direction relative to the body is provided to the bracket 40, it becomes possible to adjust the angle of the camera in the yaw direction. Furthermore, since the pitch rotation shafts 41 that allow a swinging motion of the camera 30 in the pitch direction are provided to the bracket 40, it becomes possible to adjust the angle of the camera in the pitch direction.

Note that the mode of the motorcycle, the shape and structure of the camera, the shape and structure of the bracket, the arrangement of the yaw rotation shaft and pitch rotation shafts, the arrangement of the rubber members and the like are not limited to those in the embodiment described above, but can be changed in various manners. The camera mounting structure according to the present invention can be applied not only to motorcycles, but also to saddled three-wheeled vehicles, four-wheeled vehicles and the like.

REFERENCE SIGNS LIST

1: Motorcycle (saddled vehicle)
3: Front cowl
3a: Opening
7: Headlamp
11: Front fender
30: Camera
40: Bracket
41: Pitch rotation shaft
44: Yaw rotation shaft

The invention claimed is:

1. A camera mounting structure applied to a saddled vehicle with a body having a front to which a camera is attached,
   wherein the camera is attached to a bracket,
   wherein the camera is disposed at a position on the saddled vehicle below a headlamp and above a front fender,
   wherein the bracket includes a pitch adjustment mechanism that allows a swinging motion in a pitch direction,
   wherein the pitch adjustment mechanism is disposed rearward from a guard pipe, and
   wherein the guard pipe and the pitch adjustment mechanism are overlapped as viewed from vehicle front.

2. The camera mounting structure according to claim 1, wherein the pitch adjustment mechanism is located frontward of the body from the camera.

3. The camera mounting structure according to claim 1, wherein the bracket is located below the camera.

4. The camera mounting structure according to claim 1, wherein the camera includes a pair of left and right lenses apart from each other in a vehicle width direction.

5. The camera mounting structure according to claim 1, wherein the camera includes a yaw adjustment mechanism that allows a swinging motion in a yaw direction relative to the body.

6. A camera mounting structure applied to a saddled vehicle with a body having a front to which a camera is attached,
   wherein the camera includes a pair of left and right lenses,
   wherein the camera is disposed at a position on the saddled vehicle below a headlamp and above a front fender,
   wherein the camera is attached to a bracket including a yaw adjustment mechanism that allows a swinging motion in a yaw direction relative to the body,
   wherein the bracket includes a pitch adjustment mechanism that allows a swinging motion in a pitch direction,
   wherein the camera is located above a guard pipe, and
   wherein the guard pipe overlaps the bracket as viewed from vehicle front.

7. A camera mounting structure applied to a saddled vehicle with a body having a front to which a camera is attached,
   wherein the camera is attached to a bracket which has a function of adjusting a posture of the camera,
   wherein the camera is disposed at a position on the saddled vehicle below a headlamp and above a front fender,
   wherein the camera is located above a guard pipe, and
   wherein the guard pipe overlaps the bracket as viewed from vehicle front.

8. A camera mounting structure applied to a saddled vehicle with a body having a front to which a camera is attached,
   wherein the saddled vehicle includes a headlamp and a front cowl disposed in front of a head pipe, and a guard pipe that protects the front cowl and is disposed below the headlamp,
   wherein the camera is disposed on a bracket fixed to the body at a position of the saddled vehicle below the headlamp and above a front fender, and
   wherein the guard pipe overlaps the bracket as viewed from vehicle front.

* * * * *